United States Patent [19]

Sorensen

[11] Patent Number: 4,790,995

[45] Date of Patent: Dec. 13, 1988

[54] PROCESS FOR STERILIZNG SPICES

[75] Inventor: Stig Sorensen, Lyngby, Denmark

[73] Assignee: Scanflavour A/S, Lyngby, Denmark

[21] Appl. No.: 4,438

[22] PCT Filed: Apr. 10, 1986

[86] PCT No.: PCT/DK86/00035

§ 371 Date: Dec. 8, 1986

§ 102(e) Date: Dec. 8, 1986

[87] PCT Pub. No.: WO86/05956

PCT Pub. Date: Oct. 23, 1986

[30] Foreign Application Priority Data

Apr. 11, 1985 [DK] Denmark .............. 1630/85

[51] Int. Cl.$^4$ .......................... A23L 3/00; A23L 1/22
[52] U.S. Cl. ....................... 426/302; 426/93;
426/96; 426/638; 426/511; 426/650; 426/309;
426/310
[58] Field of Search .............. 426/638, 93, 511, 650,
426/96, 305, 302, 310, 309

[56] References Cited

U.S. PATENT DOCUMENTS

| | | |
|---|---|---|
| 3,985,913 | 10/1976 | Johnson et al. |
| 4,210,678 | 7/1980 | Bayusik et al. .............. 426/638 X |
| 4,230,687 | 10/1980 | Sair et al. .............. 426/96 X |
| 4,232,047 | 11/1980 | Sair et al. .............. 426/638 X |

FOREIGN PATENT DOCUMENTS

| | | | |
|---|---|---|---|
| 0006369 | 1/1980 | European Pat. Off. | ............ 426/511 |
| 12813 | 12/1981 | European Pat. Off. | |
| 1927228 | 4/1975 | Fed. Rep. of Germany | |
| 2494564 | 5/1982 | France | ............ 426/638 |
| 52-018781 | 5/1977 | Japan | ............ 426/638 |
| 0110164 | 7/1982 | Japan | ............ 426/638 |
| 0163463 | 10/1982 | Japan | ............ 426/650 |
| 346061 | 6/1972 | Sweden | |
| 986119 | 3/1965 | United Kingdom | ............ 426/650 |

Primary Examiner—Joseph Golian
Attorney, Agent, or Firm—Birch, Stewart, Kolasch & Birch

[57] ABSTRACT

A process for sterilizing spices, in particular whole spices, by heat treatment in a sealed container at a temperature above 100° C. and coating with an edible material. This provides profound sterilization without loss of aroma and taste.

5 Claims, No Drawings

PROCESS FOR STERILIZNG SPICES

The present invention concerns a process for sterilising spices, in particular whole spices in a sealed container at a temperature above 100° C.

In the past, in particular whole spices, such as pepper, were sterilised by means of ethylene oxide. This treatment has been or will be prohibited in many countries because of the toxicity of ethylene oxide.

Sterilisation at 160° C. as described in the SE Published Application No. 346 061 and the DE Auslegeschrift No. 1 927 228 is not tolerated by spices because they char at such a high temperature.

Attempts have also been made at sterilising spices by means of a shearing treatment, cf. the EP Patent Specification No. 12 813. This method comprises subjecting spices and spice plants to shearing forces of at least 2000 Newton, in particular, in an extruder. Such a treatment is not very gentle to spices. Whole spices, e.g. peppercorns, will often be crushed, and aroma will be lost because of the crushing or grinding, whether intended or not. The treated product has a germ number of about 10 to 100 per gram.

The object of the invention is to provide an effective process for sterilising spices, which is not vitiated by the drawbacks of the known processes, and which in particular does not involve a simultaneous loss of aroma. This is obtained by the process of the invention which is characterized by coating the spice with an edible coating before the heat treatment. Such coating of a thin layer of edible material has the surprising effect that aroma losses are widely avoided. Further, the spice product will be practically germ-free. This is especially true where larger spice particles are involved, e.g. whole peppercorns. Thus, the invention is particularly advantageous in the sterilisation of whole pepper, black or white, but is also useful in connection with e.g. whole coriander, poppy seeds, caraway, cumin, clove, ginger and nutmeg. It is moreover advantageous in connection with various leaf spices, including thyme.

U.S. Pat. No. 3,985,913 discloses a coating process in connection with spray drying of condiment particles, such as flavourings and spices, where a dispersion containing the substance is provided with a coating which may optionally contain proteins, and the coated product is then dried. The process involves no sterilisation. The purpose of the coating may be purely decorative, to provide a flavoured coating or to protect e.g. sticky substances which are otherwise difficult to handle. Fungistats, bacteriostats and antioxidants may be added to the coating. Such a coating can in no way replace an ethylene dioxide treatment for sterilisation without any loss of aroma.

In the process of the invention, the heat treatment is preferably effected at 105° to 110° C. for about 5 minutes to about 2 hours. Too strong and too long heating ruin the aroma of the spice or its entire consistency (Maillard reaction). The upper limits of the heat treatment therefore depend on the nature of the spice, so-called burning being tolerated or preferred e.g. with regard to curry for certain uses. If the treatment is effected at lower temperatures and/or for too short a period, the desired sterilisation will not be obtained. A longer treatment period, up to about 2 hours, is often desirable for the treatment of large quantities and/or particularly contaminated spices, e.g. spices contaminated with sporogenous bacteria.

The selection of coating material is not particularly critical. Many different coating materials may be used, such as collagen or carbohydrates.

The selection of material depends upon the spice and its use. In the present invention it is preferred to use collagen proteins, e.g. animal protein in the form of an extract of bones, preferably hydrolysed to an average molecular weight of about 120,000. Such a material is inexpensive and can be tolerated throughout the food industry and also in domestic cooking.

Up to about 2% by weight of coating material may be used, based on the spice weight, but an amount of about 0.5 to 1.5% by weight is usually sufficient. Of course, the amount depends upon the nature and corn size of the spice and upon the nature of the coating material. Thus, black pepper requires more coating material than white pepper, because black pepper is more porous, while white pepper has a harder shell.

The invention will be explained more fully below by means of the following examples.

EXAMPLE 1

A stirred autoclave equipped with a heat jacket is filled with white peppercorns with simultaneous spraying of an aqueous solution of a coating material in the form of a hydrolysed bone extract with a molecular weigt of about 120,000, the dry matter content constituting about 0.7% by weight, based on the peppercorns. Then the autoclave is evacuated, resulting in thorough removal of the oxygen from the air. Then the autoclave is heated by means of the jacket to about 105° C. with continued stirring, and with simultaneous addition of pure water vapour at 105° C. After about 20 minutes evacuation is performed again, and then sterile air is added at ambient temperature via a bacteria filter. Finally, the autoclave is cooled externally by introduction of cold water into the jacket, and the dried, coated, cooled peppercorns are discharged.

Peppercorns thus treated are completely sterile; no germs are found, while the germ number prior to treatment was 1,000,000 per gram.

It was found in an organoleptic triangle test that the aroma and the taste were not impaired by the treatment with respect to fresh, untreated pepper. If a heat treatment (at 105° to 110° C.) is performed alone, the aroma is reduced by about 50%.

EXAMPLE 2

Example 1 was repeated with a rotating autoclave with treatment for 1 ½ hours instead of 20 minutes. The same good results were obtained with respect to sterility, aroma and taste.

I claim:

1. A process for sterilizing whole spices which consists essentially of coating a whole spice with an edible animal protein coating material in an amount of from 0.5 to 2.0% by weight, based on the weight of coated spice, to form a coated spice, and heat treating said coated spice in a sealed rotating autoclave with the simultaneous addition of water vapor at a temperature of from 105° to 110° C. for about 5 minutes to about 2 hours.

2. A process according to claim 1, wherein said animal protein is a collagen protein.

3. A process according to claim 1, further comprising vacuum drying the coated spice after the heat treating step.

4. A process according to claim 1, wherein said spice is whole pepper.

5. A process according to claim 1, which comprises applying the coating in an amount of from 0.5 to 1.0% by weight, based on the weight of the coated spice.

* * * * *